DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 6

T948,004

PROCESS FOR TEMPORARILY REDUCING NUMBER OF SPINNING ORIFICES IN SPINNERET

James O. Casey, 2476 Wildwood Drive 37660, and Bobby M. Phillips, Rte. 8, 5741 Chestnut Hills Drive 37664, both of Kingsport, Tenn.

Filed June 9, 1975, Ser. No. 585,152
Int. Cl. B28b *7/04;* D01d *1/10*
U.S. Cl. 264—40
No Drawing. 5 Pages of Specification Process for temporarily reducing the number of spinning orifices in a given spinneret to spin a specific filament count yarn and for recovering at a later time the use of all the spinning orifices, by plugging selected spinning orifices with a material suitable for withstanding normal operating temperatures and pressures encountered by a spinneret, a material such as silver solder comprising by weight about 45% silver, about 30% copper and about 25% zinc and having a melting point of about 677° C., spinning the desired specific filament count yarn from the non-plugged spinning orifices, and then removing the material used for plugging by cleaning the spinneret in a suitable molten salt bath followed with caustic and acid washes, and water rinses.